June 5, 1962 W. R. FRINT ET AL 3,037,849
METHOD FOR CRYSTALLIZING A SODIUM CARBONATE
Filed Aug. 6, 1958 3 Sheets-Sheet 3

INVENTORS
WILLIAM R. FRINT
WILLIAM C. BAUER
BY Hammond & Littell
ATTORNEYS

United States Patent Office 3,037,849
Patented June 5, 1962

3,037,849
METHOD FOR CRYSTALLIZING A
SODIUM CARBONATE
William R. Frint and William C. Bauer, Green River,
Wyo., assignors to FMC Corporation, a corporation
of Delaware
Filed Aug. 6, 1958, Ser. No. 753,574
10 Claims. (Cl. 23—300)

This invention relates to an improvement in the method of crystallizing sodium sesquicarbonate from either sodium sesquicarbonate or crude trona solutions and of crystallizing sodium bicarbonate from solutions containing the same and to the synergistic effect of certain additives on the crystal size of crystals crystallized from the above solutions.

In the vicinity of Green River, Wyoming, a vast deposit of crude trona ($Na_2CO_3 \cdot NaHCO_3 \cdot 2H_2O$) which lies some 1,100 to 1,500 feet beneath the surface of the earth has been discovered. The main trona bed is present as a seam about 12 feet in thickness at approximately the 1,500 foot level analyzing about 93% trona. Overlying the main trona bed are alternate layers of shale and thin trona deposits continuing to about the 100 foot level for a total of about 33 feet of trona within the formation between the 1,100 foot level and the 1,500 foot level.

A typical analysis of this crude trona found at Green River, Wyoming, is as follows:

*Typical crude trona analysis*

| Constituent | Percent |
|---|---|
| Sodium Sesquicarbonate ($Na_2CO_3 \cdot NaHCO_3 \cdot 2H_2O$) | 92.76 |
| NaCl | 0.08 |
| $Na_2SO_4$ | 0.02 |
| $Fe_2O_3$ | 0.14 |
| Organic Matter | 0.30 |
| Insolubles | 6.70 |
| | 100.00 |

As seen in the above analysis, the main constituent of crude trona is sodium sesquicarbonate. The amount of impurities, however, is sufficiently large that this crude trona cannot be calcined and the soda ash so produced utilized in many commercial processes. Therefore, the crude trona must be purified to remove or reduce the impurities before the soda ash produced therefrom can be sold commercially.

This crude trona is obtained at the surface for processing by a variety of methods. The trona can be mechanically mined by sinking shafts and carrying out conventional mining methods. The trona is readily soluble and can also be dissolved in an aqueous solution introduced down an input well or wells in a series of wells drilled in the formation and interconnected preferably by hydraulic fracturing of the formation, with a concentrated solution being taken out of an output well or wells. The input aqueous solution may be heated so that solution will more readily occur. The solution mining method results in a crude sodium sesquicarbonate solution which contains less insoluble impurities than that produced by dissolving the mechanically mined crude trona due to the clarification and settling which occur in the underground cavity, but the solution mined trona contains more organic impurities. Crude trona produced by either method, however, contains impurities which interfere with the normal usage of soda ash unless removed.

The conventional method of purifying crude trona and producing pure soda ash is by a series of steps involving: dissolving the crude trona (either from mechanically mined trona at the surface or from the trona bed underground) in a cycling, hot mother liquor containing excess normal carbonate over bicarbonate in order to dissolve the trona congruently, clarifying and filtering the solution, passing the filtrate to a series of vacuum crystallizers where water is evaporated and the solution is cooled causing sodium sesquicarbonate to crystallize out as the stable crystal phase, recycling the mother liquor to dissolve more crude trona and calcining the sesquicarbonate crystals to convert same to soda ash.

Sodium sesquicarbonate is also produced from brines from natural lakes such as those of Owens Lake and Searles Lake in California which contain a large amount of sodium carbonate by a process of carbonating the concentrated brine to produce a sodium sesquicarbonate composition which is recovered by cooling to crystallize sodium sesquicarbonate crystals from the solution.

Sodium bicarbonate is customarily produced by either saturating a caustic soda solution with carbon dioxide or by decomposition of sodium chloride with ammonium carbonate in the presence of an excess of carbon dioxide. The less soluble sodium bicarbonate crystallizes out (Solvay process).

As is well known, when the solubility of an inorganic salt in a solvent is exceeded, as by sufficiently lowering the temperature of an unsaturated solution or by introducing an excess of one or more of the ions involved, the salt is deposited in solid form. This first method is perhaps the most commonly used process for the production of crystalline salts, and is exemplified in the production of sodium sesquicarbonate as outlined above, where impure trona mineral is mined and purified by recrystallization of sodium sesquicarbonate from a hot, aqueous solution or by carbonation of brines and cooling. The second method is exemplified by the production of sodium bicarbonate as outlined above in the ammonia soda process.

In many cases, the type of sodium sesquicarbonate or sodium bicarbonate crystals obtained by this method are of decidedly inferior quality, considering such factors as crystal shape, purity, settling rate, size, uniformity, dewaterability, resistance to breakage and bulk density. The production of crystals having the characteristics desired in these respects has long been a problem in the production of sesquicarbonate from crude trona. The sesquicarbonate so produced is largely converted to soda ash as the final market commodity. Inferiority of the intermediate sesquicarbonate crystals, such as fine crystal size, low bulk density, etc., ordinarily leads to similar inferiority in the final soda ash product. The same problems in sodium bicarbonate manufacture also result in inferiority which is translated to the final soda ash.

The size characteristics of sodium sesquicarbonate and sodium bicarbonate crystals is greatly improved by the addition of certain anionic-active surfactants in trace amounts as is described in the copending application Ser. No. 474,828, filed December 13, 1954, now Patent No. 2,954,282. Addition of such anionic-active surfactants in amounts up to about 400 parts per million results in a settled crystal slurry that is richer in crystal content and yet is pumpable, the crystals formed are more easily separated from the slurry and the mother liquor drains more completely from the crystals. The addition of the surfactant in these amounts does not cause excessive foaming in the evaporator crystallizers.

The preferred types of these anionic-active surfactants are organic sulfate (organosulfate) or sulfonate (organosulfonate) derivatives, and of these classes, the preferred sulfonates are alkyl benzene or alkyl naphthalene sulfonates wherein alkyl carbon atoms total at least four and desirably more, and the preferred sulfates are the higher alkyl alcohol sulfates. Thus, particularly effective compounds are dodecyl benzene sulfonate and polypropylene benzene sulfonates ranging from 10 to 18 carbon atoms in the alkyl group; and dibutyl or diisopropyl naphthalene sulfonate.

Another preferred sub-class, related to the foregoing preferred sub-classes, are the taurates derived from N-alkyl-taurine ($RNHCH_2CH_2SO_3H$) and containing a higher fatty acid residue of substantial length attached to the nitrogen atom in an amide linkage. Examples are sodium-N-methyl-N-lauryl taurate, sodium-N-cyclohexyl-N-palmityl taurate, sodium-N-methyl taurate of tallow acids and sodium-N-methyl-N-oleyl taurate. Taurates containing lower fatty acid residues are proportionately less effective.

The primary alcohol sulfates containing higher alkyl groups, such as those based on lauryl alcohol, are very effective additives. Examples are sodium, ammonium and triethanolamine lauryl sulfates. Primary alcohol sulfates containing short chain alkyl groups, e.g. on the order of only 8 carbon atoms in the alkyl groups, are proportionately less effective and are not recommended. The practical upper limit is about 18 carbon atoms in the alkyl groups. Examples in the 8 to 18 carbon atom range include: sodium octyl sulfate, sodium lauryl sulfate, ammonium lauryl sulfate, triethanolamine lauryl sulfate, sodium coconut alcohol sulfate, sodium tridecyl alcohol sulfate, sodium tallow alcohol sulfate, sodium cetyl sulfate and sodium oleyl sulfate.

In general the free acids of these various surfactants may also be used, because they are converted to the sodium salts in the process liquors which are mildly alkaline, and thus function the same as the soluble salts of the additives. Cationic-active and non-ionic surfactants are totally ineffective as additives in improving the crystallization of sodium sesquicarbonate.

Up to about 100 parts per million (p.p.m.) of surfactant are recommended in the crystallization of sodium sesquicarbonate, but for various reasons the preferred concentration is about 5 to 30 p.p.m. Levels below 5 p.p.m. show some beneficial effect, but are not the preferred concentration. Similarly, amounts in excess of 100 p.p.m. may be used with beneficial results, but complicating effects may begin to appear at excessively high levels, such as crystal twinning or branching, and contamination of the product, and the use of these higher concentrations is, of course, economically undesirable. The levels specified herein refer to the active content of the various commercial preparations available, unless otherwise noted.

In the preparation of sodium bicarbonate by the ammonia soda process, it has been found necessary in laboratory scale runs to use slightly higher concentrations of the additive, up to about 300 to 400 p.p.m., but preferably on the order of about 100 p.p.m., in the liquor from which the sodium bicarbonate is crystallized or precipitated by the introduction of carbon dioxide.

The benefits derived from the use of surfactants in the preparation of sodium bicarbonate crystals are also obtained where the crystallization is effected by cooling a solution saturated with sodium bicarbonate.

It is an object of this invention to still further improve the crystal growth of sodium sesquicarbonate and sodium bicarbonate through a synergistic effect of an anionic-active surfactant in the presence of small amounts of sulfate ions.

It is a further object of our invention to obtain large, easily dewatered crystals of sodium sesquicarbonate which upon calcining give an almost completely dust free soda ash.

Other objects and advantages of the invention will appear from a consideration of the following disclosure.

We have found that the good crystal growth of sodium sesquicarbonate and sodium bicarbonate obtained by the addition of up to about 400 parts per million of anionic-active surfactants as disclosed in the copending application Ser. No. 474,828, now Patent No. 2,954,282, can be further improved by the presence of small amounts of sulfate ions. The effect on the crystal growth is a true synergistic effect, the results being much greater than a mere cumulative effect.

The attached illustrations demonstrate this synergistic effect of the addition of an anionic-active surfactant and sulfate ions in the crystal growth of sodium sesquicarbonate and sodium bicarbonate. These illustrations are photographic reproductions from reflection photomicrographs of crystals of sodium sesquicarbonate and sodium bicarbonate produced in the presence of various additives. The conditions of saturation, rate of cooling and size of crystallizer vessels were held constant.

*Group I*—Laboratory prepared crystals from C.P. chemicals. Magnification in photomicrographs (15×):

Figure 16:

*Group II.*—Plant prepared crystals:

FIG. 16 shows a shadow photograph of 10× magnification of sodium sesquicarbonate crystals prepared from a crude trona solution in the presence of 15 p.p.m. of sodium dodecyl benzene sulfonate.

Figure 17:

FIG. 17 shows a shadow photograph of 10× magnification of sodium sesquicarbonate crystals prepared from a crude trona solution in the presence of 15 p.p.m. of sodium dodecyl benzene sulfonate and 0.6% of sulfate ions calculated as sodium sulfate.

These illustrations disclose the startling increase in crystal size which results by growing sodium sesquicarbonate and sodium bicarbonate crystals in the presence of both an anionic-active surfactant and sulfate ions. This increase in crystal size is important for dewaterability and filtration of the crystals in the manufacturing process and the percentage of crystals which will be retained on a 100 mesh screen becomes much greater. In addition, we have found that the crystals themselves are changed in character. They are wider as compared to their length and their crystalline habit has changed.

Figure 7:
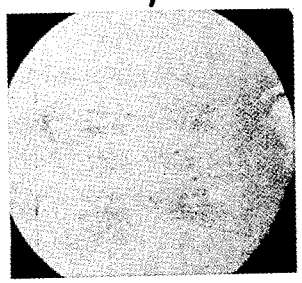
FIG. 7 shows sodium sesquicarbonate crystals prepared in the presence of 2% sulfate ions calculated as sodium sulfate and 20 p.p.m. of sodium dodecyl benzene sulfonate. The crystals are immerged in a refractive index oil so that the "hourglass" crystal habit can be observed.

The change in crystalline habit is demonstrated by the presence of an "hourglass" configuration inside the sesquicarbonate crystals in all of the larger crystals grown in the presence of sulfate ions and anionic-active surfactants as shown in FIG. 7. Generally, the hourglass is only visible when the crystals are immerged in a refractive index oil. However, in some of the largest crystals a faint outline is visible in air. With sesquicarbonate crystals, the refractive index oils render the crystal invisible so that the modification lines are seen. The hourglass shows up as a dark section starting at the center of the crystal and proceeding outwards to the ends.

In the following table some of the characteristics of the sodium sesquicarbonate crystals produced in the laboratory with the use of sodium dodecyl benzene sulfonate as the anionic-active surfactant and/or sodium sulfate as the sulfate ion as additives are listed. The experiments were performed using C.P. reagents to make a carbonate-bicarbonate solution. The standard solution had a saturation temperature of 83° C. with a 12.2 percent excess of sodium carbonate. This excess carbonate is necessary in order to crystallize sodium sesquicarbonate from the solution. This composition was used as a blank and as a starting solution to which the reagents or combination of reagents to be tested were added. When all the material was dissolved, the solution was cooled with stirring, to effect crystallization. The crystals grown were washed with acetone during centrifuging and then screened for size. In addition, the crystals were examined under a microscope for any peculiar habit.

resulted upon addition of sulfate ions to the saturated solution.

Several laboratory crystallization tests were made using plant filtrate liquors. The crystals made from plant filtrate tended to be somewhat larger than the crystals made from the reagent chemical liquor.

TABLE II

*Effect of Sodium Sulfate on Crystal Size*

[Each solution contains 20 p.p.m. of sodium dodecyl benzene sulfonate]

| Example | Sulfate Added, percent | Plant Filtrate, mesh | |
|---|---|---|---|
| | | +60 | +100 |
| 15 | 0 | 42 | 70 |
| 16 | 0.5 | 79 | 96 |
| 17 | 1.0 | 81 | 96 |
| 18 | 2.0 | 70 | 90 |

This table shows that a concentration of one-half percent of sulfate ions calculated as sodium sulfate in the plant system will greatly increase the particle size. The addition of sulfate beyond this level results in shorter, stronger crystals which give decreased breakage on the centrifuge.

EXAMPLE 19

To determine the effect of sulfate addition in the commercial process of purifying crude trona the following experiments were performed in a plant producing 1,000 tons per day of sodium carbonate and operating substantially as described previously. Sodium dodecyl benzene sulfate as an anionic-active surfactant was maintained at a 15 part per million level in the plant liquors throughout the experiment. For a period of twenty-four hours, sufficient sulfuric acid was added to the mother liquor feeding the crystallizers to maintain an average percent of sodium sulfate in the feed liquor of 0.6%. The mother liquor

TABLE I

*Effect of Various Additives on Laboratory Produced Sodium Sesquicarbonate Crystals*

Figure 1:
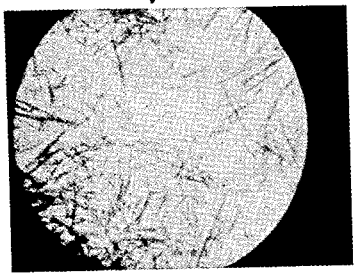
FIG. 1 shows crystals of sodium sesquicarbonate prepared with C.P. chemicals without additives.
Figure 2:
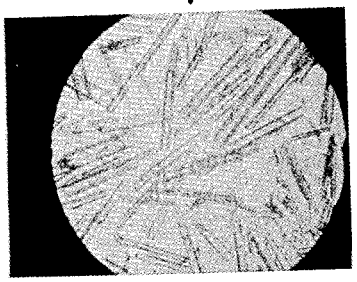
FIG. 2 shows crystals of sodium sesquicarbonate prepared in the presence of 2% sulfate ion calculated as sodium sulfate.
Figure 3:
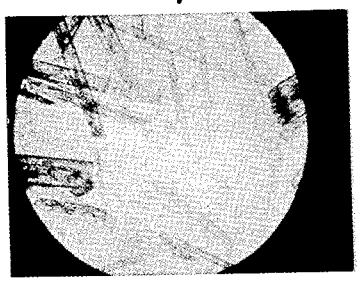
FIG. 3 shows sodium sesquicarbonate crystals prepared in the presence of 20 p.p.m. of sodium dodecyl benzene sulfonate.
Figure 4:
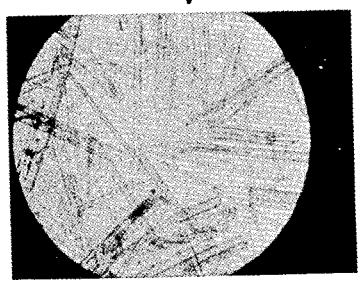
FIG. 4 shows sodium sesquicarbonate crystals prepared in the presence of 50 p.p.m. of sodium dodecyl benzene sulfonate.
Figure 5:
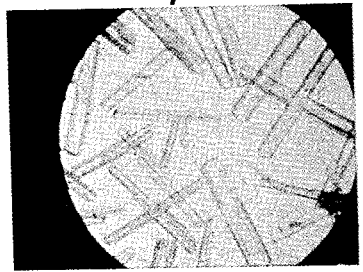
FIG. 5 shows sodium sesquicarbonate crystals prepared in the presence of 2% sulfate ions calculated as sodium sulfate and 10 p.p.m. of sodium dodecyl benzene sulfonate.
Figure 6:
FIG. 6 shows sodium sesquicarbonate crystals prepared in the presence of 2% sulfate ions calculated as sodium sulfate and 20 p.p.m. of sodium dodecyl benzene sulfonate.

| Example | Surfactant,[1] p.p.m. | Sodium Sulfate, percent | Length/Width Ratio | Percent +60 Mesh | Percent +100 Mesh | Comments |
|---|---|---|---|---|---|---|
| 1 | 0 | 0 | 20-25 | 7 | 21 | Fig. 1. |
| 2 | 20 | 0 | 20-25 | 35 | 52 | Fig. 3. |
| 3 | 200 | 0 | 30-60 | 40 | 51 | |
| 4 | 400 | 0 | 25-35 | 36 | 51 | Many broken. |
| 5 | 0 | 0.5 | 20-25 | | low | Intermeshed inclusions. |
| 6 | 0 | 1.0 | 20-25 | 38 | 64 | Twinning, minor faces. |
| 7 | 0 | 1.5 | 15-20 | 33 | 59 | |
| 8 | 0 | 2.0 | 10-15 | 44 | 60 | Fig. 2—irregular cross section. |
| 9 | 0 | 2.5 | 7-15 | 44 | 66 | No inclusions, irregular cross-section. |
| 10 | 0 | 3.0 | 10-15 | 52 | 74 | Do. |
| 11 | 10 | 2.0 | 5-10 | 70 | 90 | Fig. 5 Twinning, faint hour-glass. |
| 12 | 20 | 2.0 | 5-8 | 90 | 97 | Fig. 6 Twinning, faint hour-glass. |
| 13 | 50 | 2.0 | 5-8 | 97 | 99 | Parallel twinning, notches hourglass, hexagonal cross section. |
| 14 | 100 | 2.0 | 5-10 | 100 | 100 | |

[1] Sodium dodecyl benzene sulfonate.

Twinning is the effect of two or more crystals developing from the same nucleus and being attached to each other. An hourglass configuration is caused by crystal modification lines within the crystal and indicates that the additives effect growth by adsorption on the ends of the crystal.

In the commercial process of purifying crude trona in plant operations by the process of crystallization of sodium sesquicarbonate, as discussed, wherein an anionic-active surfactant is added, we found that a similar improvement in the crystal growth of sodium sesquicarbonate being alkaline readily neutralizes the sulfuric acid to form sodium sulfate. In Table III the left column is the screen analysis of the crystals from the third stage vacuum crystallizers before sulfate addition and the right column is the maximum crystal size attained as a result of the addition of sulfate ions. The crystals reached a maximum size some 2–3 hours after addition of the sulfate was started. FIG. 16 is a photomicrograph of the crystals obtained before addition of the sulfate and FIG. 17 is a photomicrograph of the crystals of sodium sesquicarbonate obtained after addition of the sulfate.

TABLE III

| Percent U.S. Screen | Before | After |
|---|---|---|
| +40 | 8.2 | 57.9 |
| +60 | 29.9 | 87.8 |
| +100 | 82.5 | 98.0 |
| −100 | 17.5 | 2.0 |

The soda ash produced from the crystals of sodium sesquicarbonate grown in the presence of the anionic-active surfactant and sulfate ions was improved also as shown in Table IV.

TABLE IV

*Sodium Carbonate Produced by Calcining Sodium Sesquicarbonate Crystals*

|  | Before | After |
|---|---|---|
| Percent Screen Analysis: | | |
| +100 | 74.1 | 89.0 |
| −100 | 25.9 | 11.0 |
| Foam Height [1] | 94 | 70 |
| Chemical Oxygen Demand [1] | 548 | 458 |
| Bulk Density | 48.4 | 49.2 |

[1] Both foam height and chemical oxygen demand (COD) are measurements of organics present.

The synergistic effect of the presence of anionic-active surfactant and the sulfate ion increases the size of the sodium sesquicarbonate crystals considerably. We have found that for optimum results in plant solutions, a concentration of 0.5% to 0.8% of the total crystallizer feed solution of sulfate ion, calculated as sodium sulfate is needed to produce large sodium sesquicarbonate crystals consistently, although smaller amounts down to 0.3% result in some effectiveness. Conversely amounts up to 5% or more of sulfate ion calculated as sodium sulfate can be used. The top limit of sulfate ion is the concentration at which hydrated sodium sulfate will crystallize with the sodium sesquicarbonate, which will contaminate the resulting soda ash. This value is somewhat over 5% of sulfate ion calculated as sodium sulfate.

In the process which obtains sodium sesquicarbonate from natural brines such as those from Owens Lake in California, there usually is a sufficient sulfate content in the natural brine so that more is not needed to effect optimum crystallization with a surface active agent and sulfate ion combination.

In the following table (Table V) some of the characteristics of sodium bicarbonate crystals produced with the use of sodium dodecyl benzene sulfonate as the anionic-active surfactant and/or sodium sulfate as the sulfate ion as additives are listed. These experiments were performed using C.P. sodium bicarbonate to prepare the solution. The standard solution was a 25% NaHCO₃ and had a saturation temperature of about 95° C. This solution was used as a blank and as a starting solution to which the reagents or combination of reagents to be tested were added. When all the material was dissolved, the solution was cooled with stirring, to effect crystallization. The crystals grown were washed with acetone during centrifuging and then screened for size. In addition, the crystals were examined under a microscope for any peculiar habit.

TABLE V

*Effect of Various Additives on Sodium Bicarbonate Crystals*

Figure 8:
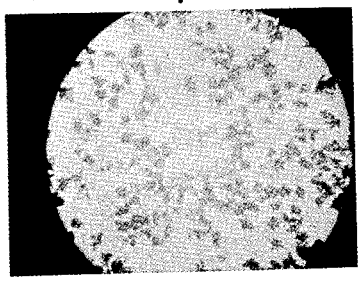
FIG. 8 shows sodium bicarbonate crystals prepared with C.P. chemicals without additives.
Figure 9:
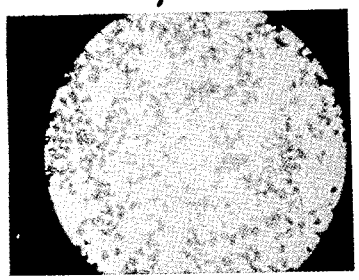
FIG. 9 shows sodium bicarbonate crystals prepared in the presence of 2% sulfate ion calculated as sodium sulfate.
Figure 10:
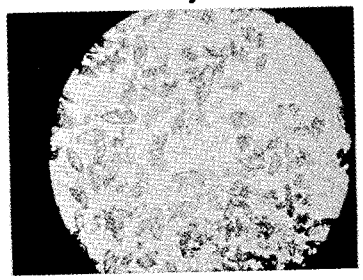
FIG. 10 shows sodium bicarbonate crystals prepared in the presence of 5% sulfate ion calculated as sodium sulfate.
Figure 11:
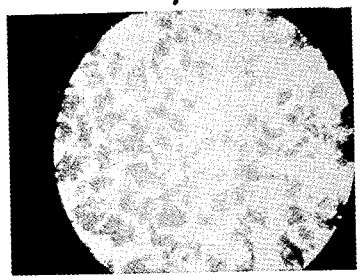
FIG. 11 shows sodium bicarbonate crystals prepared in the presence of 50 p.p.m. of sodium dodecyl benzene sulfonate.
Figure 12:
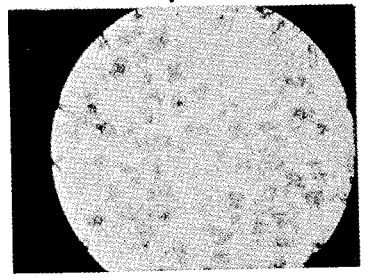
FIG. 12 shows sodium bicarbonate crystals prepared in the presence of 100 p.p.m. of sodium dodecyl benzene sulfonate.
Figure 13:
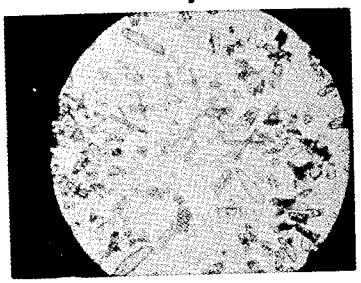
FIG. 13 shows sodium bicarbonate crystals prepared in the presence of 400 p.p.m. of sodium dodecyl benzene sulfonate.
Figure 14:
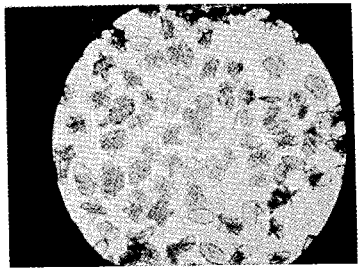
FIG. 14 shows sodium bicarbonate crystals prepared in the presence of 2% sulfate ions calculated as sodium sulfate and 50 p.p.m. of sodium dodecyl benzene sulfonate.
Figure 15:
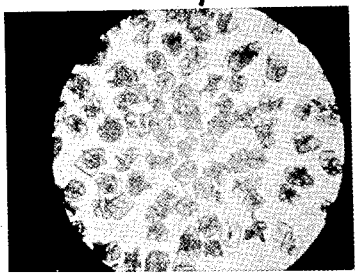
FIG. 15 shows sodium bicarbonate crystals prepared in the presence of 2% sulfate ions calculated as sodium sulfate and 100 p.p.m. of sodium dodecyl benzene sulfonate.

| Example | Surfactant,[1] p.p.m. | Sodium Sulfate, Percent | Comments |
|---|---|---|---|
| 20 | 0 | 0 | Fig. 8. |
| 21 | 0 | 2.0 | Fig. 9. |
| 22 | 0 | 5.0 | Fig. 10. |
| 23 | 50 | 0 | Fig. 11. |
| 24 | 100 | 0 | Fig. 12. |
| 25 | 400 | 0 | Fig. 13. |
| 26 | 50 | 2 | Fig. 14. |
| 27 | 100 | 2 | Fig. 15. |

[1] Sodium dodecyl benzene sulfonate.

It was found that the effect of addition of both sodium sulfate and sodium dodecyl benzene sulfonate on the sodium bicarbonate crystals was to change their habit form to that of almost a cube with much more uniform sized crystals as is readily apparent by visual examination.

The sulfate ions can be added in any form which will result in maintaining the required concentration in the alkaline sodium sesquicarbonate or sodium bicarbonate solution. Any of the alkali metal sulfates, ammonium sulfate or sulfuric acid, can be utilized, however, to avoid contamination of the sodium sesquicarbonate or sodium bicarbonate crystals produced, it is preferable to utilize sodium sulfate, ammonium sulfate or sulfuric acid. The latter forms sodium sulfate upon addition to the liquor. Ammonium sulfate is converted to sodium sulfate with evolution of ammonia during the evaporation-crystallizing step.

While we have given certain specific embodiments of our invention, we wish it to be understood that the present invention is not limited to these embodiments, and that various changes and modificaitons may be made therein without departing from the spirit of our invention or the scope of the claims.

We claim:
1. A process for preparing carbonate crystals selected from the group consisting of sodium sesquicarbonate and sodium bicarbonate, from aqueous solutions containing carbonates selected from the group consisting of sodium bicarbonate and mixtures of sodium carbonate and sodium bicarbonate, which crystals are improved in size, dewatering ability and settling rate, which comprises adding to said aqueous solutions prior to initial crystallization, up to about 400 parts per million of an anionic-active surfactant selected from the group consisting of (1) alkyl benzene sulfonates containing at least 8 carbon atoms in the alkyl chain, (2) alkyl naphthalene sulfonates containing at least 4 carbon atoms in the alkyl chain, (3) primary alkyl alcohol sulfates containing at least 10 carbon atoms and (4) N-substituted taurines of the formula R'R"NCH₂CH₂SO₃M where R' is a hydrocarbon radical, R" is the acyl radical of a higher fatty acid and M is an alkali metal and adding to said trona solution an additional amount of sulfate ions over that normally contained therein to bring the sulfate ion content in said solution to between 0.3% to 5%, when calculated as sodium sulfate, crystallizing said carbonate crystals from the said solution and separating said crystals from the mother liquor.

2. The process of claim 1 wherein sodium sesquicarbonate is crystallized and the surfactant is present in the aqueous solution prior to crystallization in a concentration of from about 5 to about 100 parts per million and the sulfate ion concentration in the same solution is from 0.3% to 0.8% when calculated as sodium sulfate.

3. The process of claim 2 wherein the surfactant is an alkyl benzene sulfonate containing at least 8 carbon atoms in the alkyl chain.

4. The process of claim 3 wherein the free sulfate ions are produced from sodium sulfate.

5. The process of claim 3 wherein the free sulfate ions are produced from sulfuric acid.

6. A process of preparing large, uniform-sized, easily dewatered crystals of sodium sesquicarbonate which comprises crystallizing said crystals from a saturated aqueous solution in the presence of a combination of about 5 to about 400 parts per million of a branched alkyl chain dodecyl benzene sulfonate and 0.3 to 5% of sulfate ions calculated as sodium sulfate and separating said crystals from said saturated solution.

7. In the process of recovering sodium carbonate from crude trona by dissolving the crude trona containing some sodium sulfate therein in hot cycling mother liquor, clarifying the hot saturated solution, crystallizing sodium sesquicarbonate from said hot saturated solution by evaporating water therefrom and simultaneously cooling said solution, separating the crystals of sodium sesquicarbonate from said mother liquor, recycling said mother liquor to dissolve more crude trona, calcining the sodium sesquicarbonate crystals to produce sodium carbonate, the improvement which consists in adding from about 5 to about 100 parts per million of an anionic-active surfactant selected from the group consisting of (1) alkyl benzene sulfonates containing at least 8 carbon atoms in the alkyl chain, (2) alkyl naphthalene sulfonates containing at least 4 carbon atoms in the alkyl chain, (3) primary alkyl alcohol sulfates containing at least 10 carbon atoms and (4) N-substituted taurines of the formula $$R'R''NCH_2CH_2SO_3M$$

where $R'$ is a hydrocarbon radical, $R''$ is the acyl radical of a higher fatty acid and $M$ is an alkali metal, and adding to said trona solution an additional amount of sulfate ions over that normally contained therein to bring the sulfate ion content in said solution to between 0.3% to 0.8% calculated as sodium sulfate to the hot saturated solution prior to the crystallization step in order to obtain larger, more uniform sodium sesquicarbonate crystals which crystals are more readily separated from the mother liquor and can almost completely be freed of adhering mother liquor.

8. The process of claim 7 wherein the anionic-active surfactant is sodium dedecyl benzene sulfonate and the sulfate ions are produced from sulfuric acid.

9. A process for preparing crystals of sodium bicarbonate, which crystals are improved in size, dewatering ability and settling rate, which comprises crystallizing said sodium bicarbonate crystals from an aqueous solution in the presence of from about 5 to about 400 parts per million of an alkyl benzene sulfonate containing at least 8 carbon atoms in the alkyl chain and from 0.3% to 5% of free sulfate ions calculated as sodium sulfate and separating said crystals from said solution.

10. A process for the preparation of sodium sesquicarbonate crystals having improved size, dewaterability and settling rate from crude trona which comprises dissolving the crude trona containing some sodium sulfate in a cycling mother liquor containing excess normal carbonate over bicarbonate, clarifying the said solution, adding to said solution up to about 400 parts per million of a crystallization additive selected from the group consisting of (1) alkyl benzene sulfonates containing at least 8 carbon atoms in the alkyl chain, (2) alkyl naphthalene sulfonates containing at least 4 carbon atoms in the alkyl chain, (3) primary alkyl alcohol sulfates containing at least 10 carbon atoms and (4) N-substituted taurines of the formula $R'R''NCH_2CH_2SO_3M$ where $R'$ is a hydrocarbon radical, $R''$ is the acyl radical of a higher fatty acid and $M$ is an alkali metal and, adding to said trona solution an additional amount of sulfate ion over that normally contained therein to bring the sulfate ion content in said solution to between 0.3% and 5.0% of said solution and crystallizing sodium sesquicarbonate crystals of improved size, dewaterability and settling rate from said solution.

References Cited in the file of this patent

UNITED STATES PATENTS

| | | |
|---|---|---|
| 1,766,705 | Dehnel | June 24, 1930 |
| 2,595,238 | Frejacques | May 6, 1952 |
| 2,626,852 | Byrns | Jan. 27, 1953 |
| 2,642,342 | Vahl | June 16, 1953 |
| 2,670,269 | Rahn | Feb. 23, 1954 |
| 2,720,446 | Whetstone et al. | Oct. 11, 1955 |
| 2,780,520 | Pike | Feb. 5, 1957 |
| 2,954,282 | Bauer et al. | Sept. 27, 1960 |

OTHER REFERENCES

Perry et al. in "Surface Active Agents," publ. by Interscience Publishers, Inc. N.Y., 1949, page 102.

Buckley: Crystal Growth, chap. 10, pages 339–387 (1951).